(12) United States Patent
Suzuki et al.

(10) Patent No.: US 6,244,192 B1
(45) Date of Patent: Jun. 12, 2001

(54) XY TABLE

(75) Inventors: Takeo Suzuki; Tomoharu Takeshita; Ryuichiro Tominaga; Yoshiaki Kubota, all of Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/446,096

(22) PCT Filed: Jun. 17, 1998

(86) PCT No.: PCT/JP98/02681

§ 371 Date: Jan. 31, 2000

§ 102(e) Date: Jan. 31, 2000

(87) PCT Pub. No.: WO98/58387

PCT Pub. Date: Dec. 23, 1998

(30) Foreign Application Priority Data

Jun. 18, 1997 (JP) .................................................... 9-178906

(51) Int. Cl.[7] .................................................. G05B 11/00
(52) U.S. Cl. ............................................. 108/20; 108/102
(58) Field of Search ......................... 108/20, 143, 50.13, 108/102, 137

(56) References Cited

U.S. PATENT DOCUMENTS 4,667,139 * 5/1987 Hirai et al. ........................ 318/135 X

FOREIGN PATENT DOCUMENTS

| 1-195389 | 8/1989 | (JP) . |
| 5-100062 | * 4/1993 | (JP) . |
| 9-123034 | * 5/1997 | (JP) . |
| 9-201031 | * 7/1997 | (JP) . |

* cited by examiner

*Primary Examiner*—Janet M. Wilkens
(74) *Attorney, Agent, or Firm*—Armstrong, Westerman, Hattori, McLeland & Naughton, LLP

(57) ABSTRACT

An XY table provided with an X-axis table (3) supported on a base movably in the X-axis direction, a Y-axis table (12) supported on the base movably in the Y-axis direction, and a top table (20) movable in the X-axis direction together with the Y-axis table (12), and further provided with an armature (6) of a linear motor (5) mounted on an X-axis base (1) supporting the X-axis table (3), a movable element (7) mounted on the back of the X-axis table (3) and opposed to the armature (6), and armature (15) of a linear motor (14) mounted on a Y-axis base (10) supporting the Y-axis table (12), and a movable element (16) mounted on the back of the Y-axis table (12) and opposed to the armature (15). The top table can be positioned with high precision and moved at high acceleration and deceleration.

3 Claims, 4 Drawing Sheets

XY TABLE

TECHNICAL FIELD

The present invention relates to an XY table which is used as a positioning table in semiconductor assembling equipment, machine tools, measurement equipment, etc.

BACKGROUND OF THE INVENTION

A prior art XY table is constructed as shown in FIG. 4. In the same drawing, a base is indicated by 30, on which a guide rail 31 installed in the X-axis direction and a guide rail 32 installed at the end portion of the guide rail 31 in the Y-axis direction are provided on the base 30. An X-axis table is indicated by 33, which is placed on the guide rail 31 movably in the X-axis direction, and two guide rollers 34 and 35 are attached on the X-axis table 33. An X-axis drive motor is indicated by 36, and an X-axis feed screw 37 having a ball screw is connected to the rotating shaft on the X-axis drive motor 36. A ball nut (not illustrated) attached to the rear side of the X-axis table 33 is screwed in the X-axis feed screw 37, whereby the X-axis table 33 is driven to move in the X-axis direction by rotations of the X-axis feed screw 37. A Y-axis table 38 is placed on the guide rail 32 and attached thereon so as to be movable in the Y-axis direction, and a guide rail 39 extending in the X-axis direction is laid on the Y-axis table 38. A Y-axis drive motor is indicated by 40, and a Y-axis feed screw 41 having a ball screw is connected to the rotating shaft of the Y-axis drive motor, wherein a ball nut (not illustrated) attached on the rear side of the Y-axis table 38 is screwed in the Y-axis feed screw 41, and the Y-axis table 38 is constructed so as to be moved in the Y-axis direction by rotations of the Y-axis feed screw 41. A top table is indicated by 42, in which a groove 43 extending in the Y-axis direction is provided at one side of the top table 42, and one guide roller 34 secured at the X-axis table 33 is brought into contact with the side of the top table 42 while the other guide roller 35 is inserted into the groove 43.

Next, a description is given of the actions of the XY table. As the X-axis drive motor 36 is driven, the X-axis table 33 moves in the X-axis direction via the ball screw of the X-axis feed screw 37 connected to the axis end of the rotating shaft of the X-axis drive motor 36, and at the same time, the top table 42 moves in the X-axis direction via the guide rollers 34 and 35 secured on the X-axis table 33. Next, as the Y-axis drive motor 40 is driven, the Y-axis table 38 moves in the Y-axis direction via the ball screw of the Y-axis feed screw connected to the axis end of the Y-axis drive motor 40. As the Y-axis table 38 moves in the Y-axis direction, the top table 42 on the guide rail 39 laid on the Y-axis table moves in the Y-axis direction integral with the Y-axis table. As the top table 42 moves in the Y-axis direction, the guide rollers 34 and 35 of the X-axis table 33 cause the top table 42 to move and stop at an appointed position while sliding along the side of the top table 42 or in the groove 43.

However, the prior art XY table connects the ball screws attached to the rear side of the X-axis table 33 and Y-axis table 38 to the ball screws of the X-axis feed screw 37 and Y-axis feed screws 41 each connected to the X-axis drive motor 36 and the Y-axis drive motor 40 and cause the X-axis table 33 and the Y-axis table 38 to move. Therefore, it is not possible for the X-axis table 33 and the Y-axis table 38 to be accurately positioned due to errors in screw connection between the ball screw and ball nut. Further, it is not possible for the X-axis table 33 and Y-axis table 38 to move at high-speed acceleration and deceleration by a speed limitation of the ball screws. Therefore, the top table 42, which moves in compliance with the X-axis table 33 and Y-axis table 38 cannot be accurately positioned. Also, the top table 42 cannot be moved at high-speed acceleration and deceleration.

SUMMARY OF THE INVENTION

Therefore, it is an object of the invention to provide an XY table which can allow the top table to be positioned at high accuracy and to be moved at high-speed acceleration and deceleration.

In order to solve the above-mentioned problems and shortcomings, the invention provides an XY table which comprises an X-axis table movably supported on a base in the X-axis direction; a Y-axis table movably supported on the base in the Y-axis direction; and a top table which is movable in the X-axis direction along with movements of the X-axis table and movable in the Y-axis direction along with movements of the Y-axis table, wherein the XY table further comprises an armature of a linear motor attached on an X-axis base which movably supports the X-axis table, a movable element which is attached to the rear side of the X-axis table and is opposed to the armature of the linear motor, an armature of a linear motor attached to the Y-axis base which supports the Y-axis, and a movable element which is attached to the rear side of the Y-axis table and is opposed to the armature of the linear motor.

DESCRIPTION OF A PREFERRED EMBODIMENT OF THE INVENTION

Figure 1:
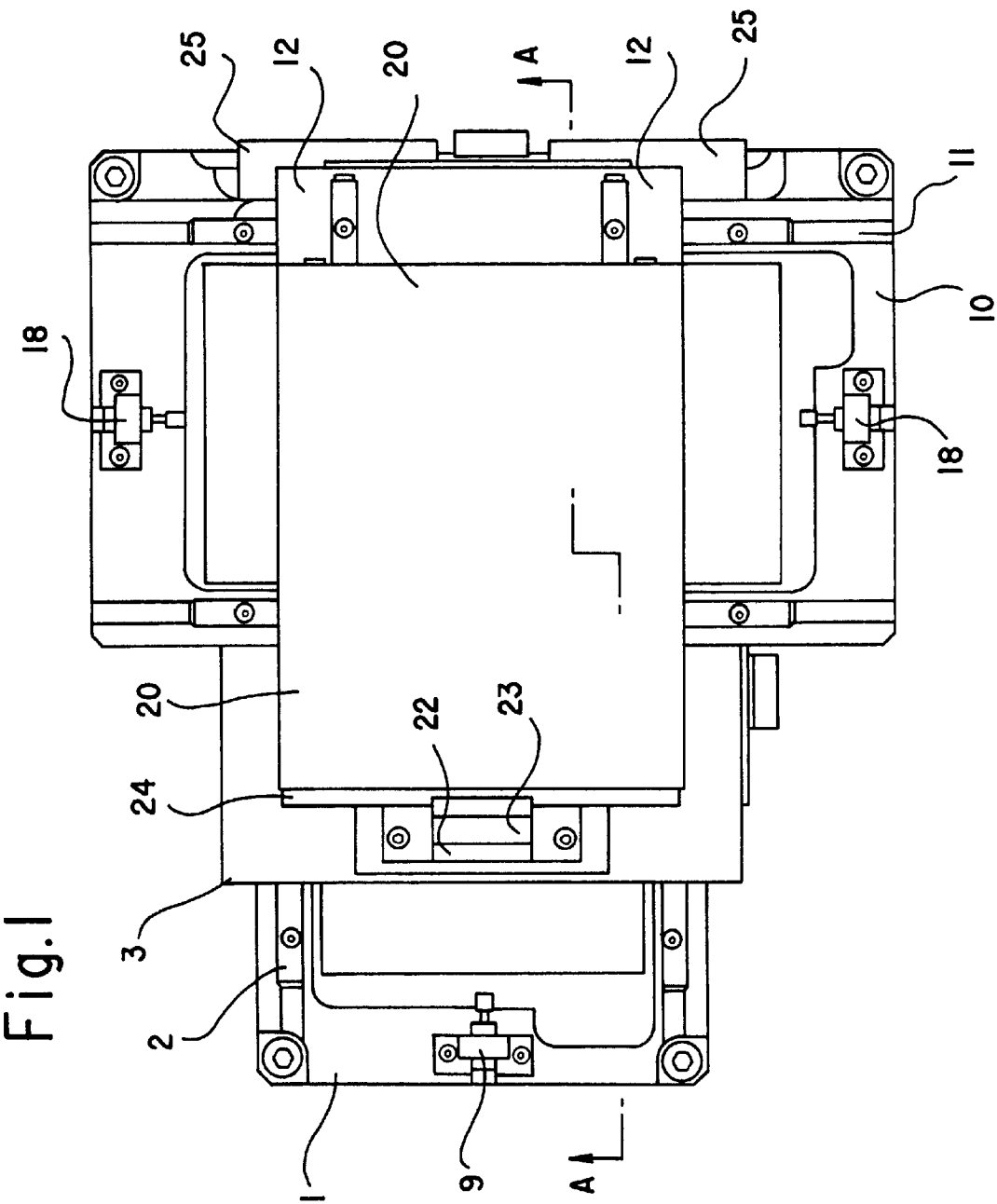
FIG. 1 is a plan view of an XY table showing a preferred embodiment of the invention.
Figure 2:
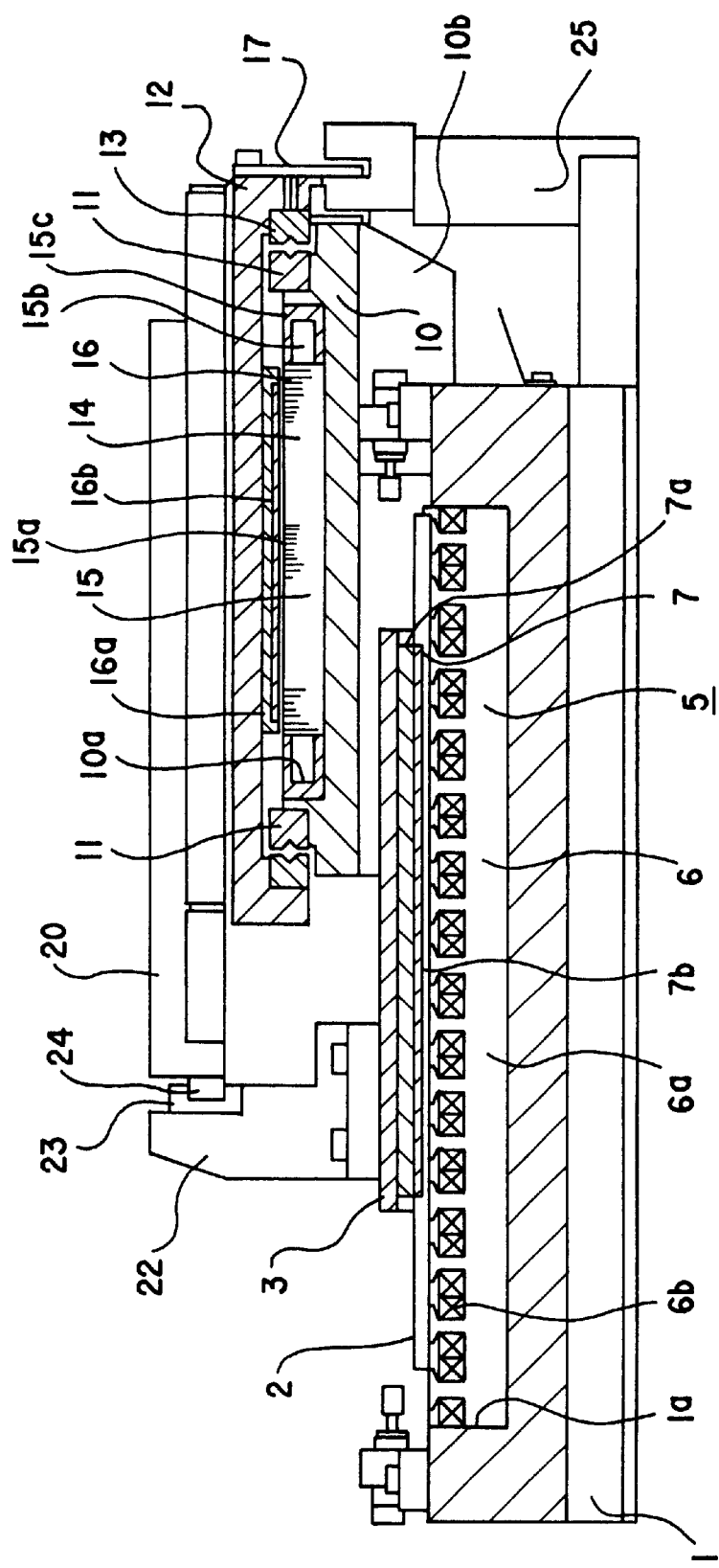
FIG. 2 is a cross-sectional view taken along the A—A in FIG. 1.
Figure 3:
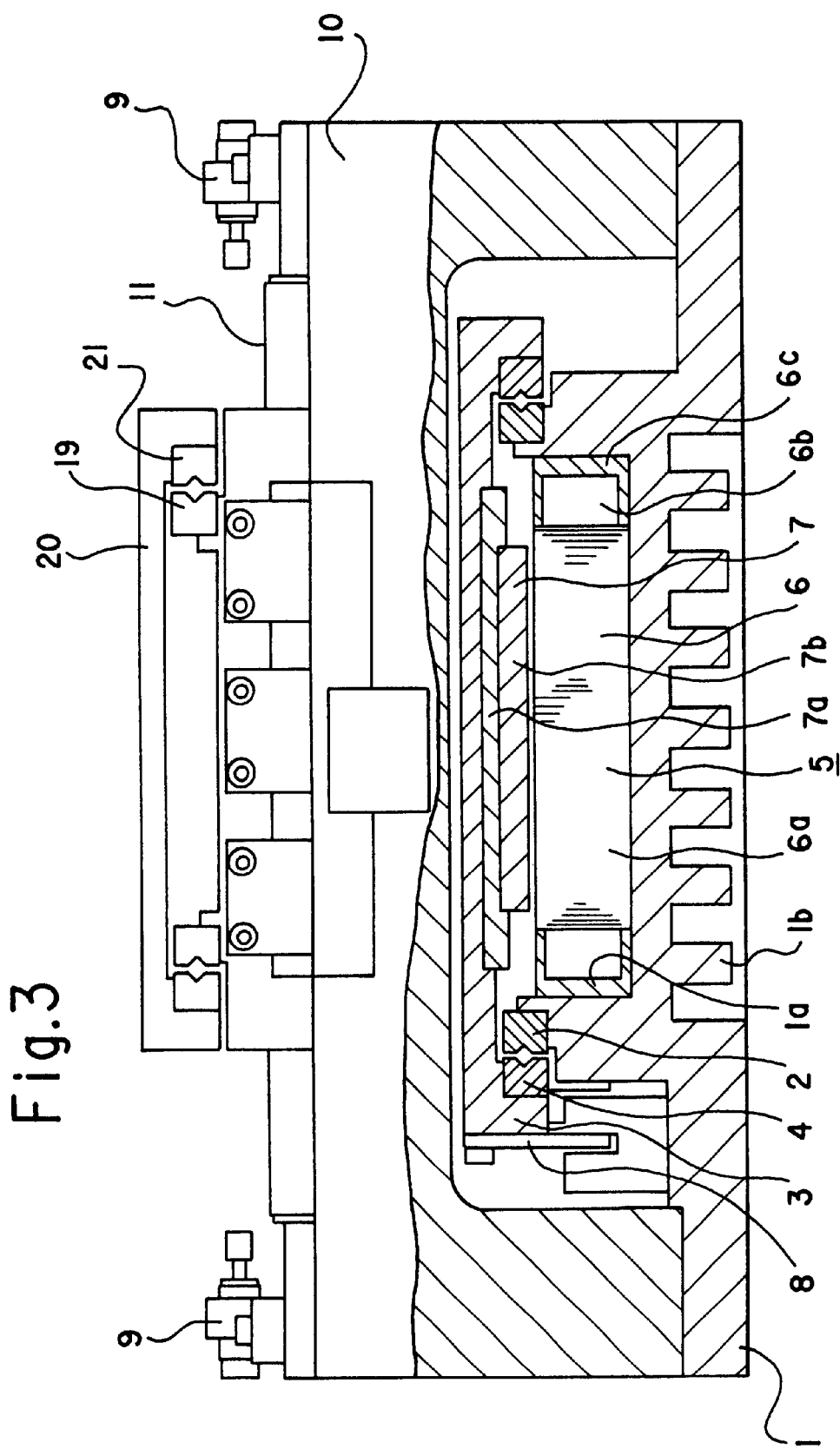
FIG. 3 is a side elevational view of a preferred embodiment of the invention with a part of the XY table shown in a cross-section.
Figure 4:
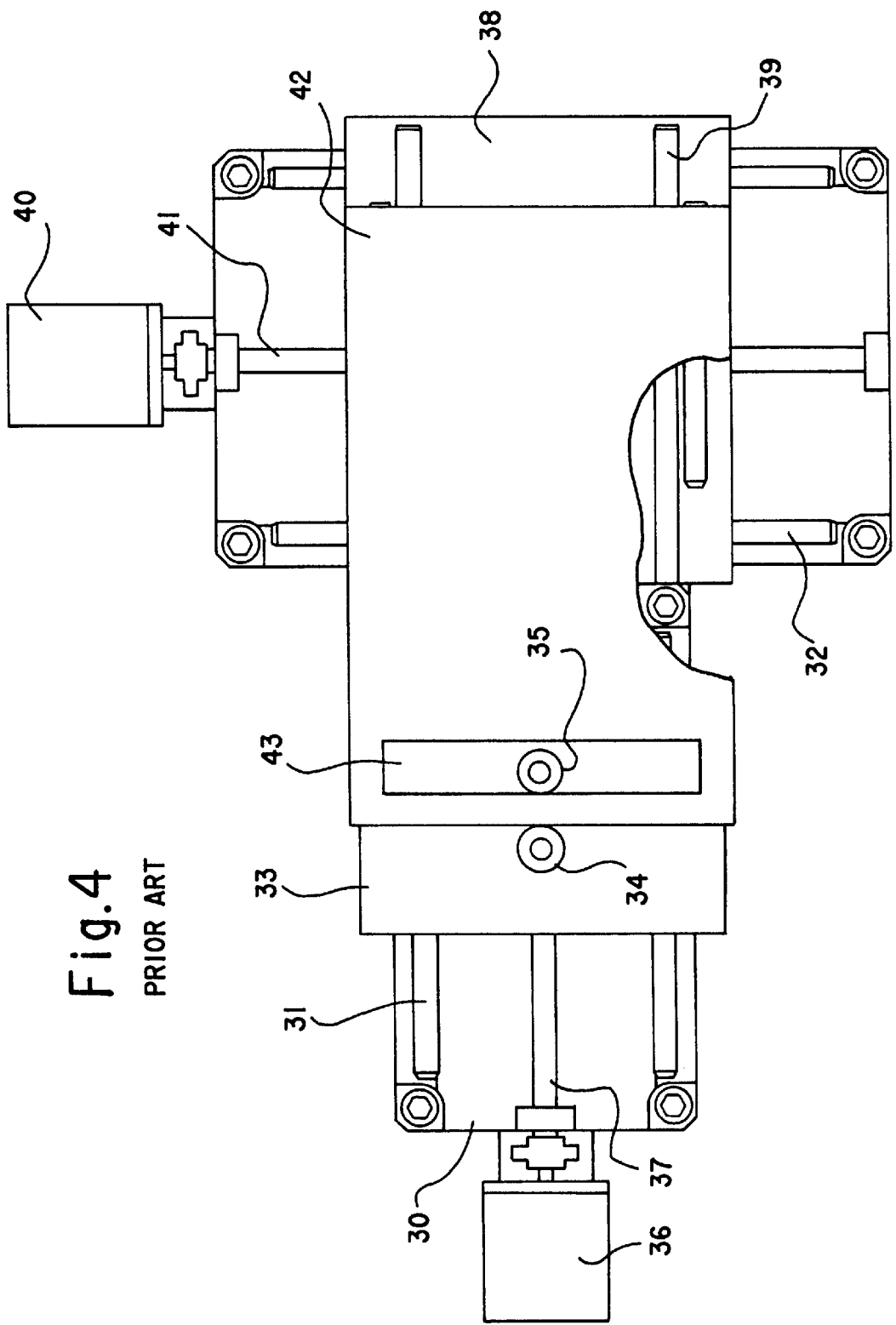
FIG. 4 is a plan view of a prior art XY table.

FIG. 1 is a plan view of an XY table showing a preferred embodiment of the invention, FIG. 2 is a cross-sectional view taken along the line A—A in FIG. 1, and FIG. 3 is a side elevational view showing a preferred embodiment of the invention with a part of the XY table shown in a cross-section.

In the drawings, reference numeral 1 indicates an X-axis base, and a projecting portion protruding in the X-axis direction is provided at the center of the upper surface of the X-axis base 1. A recess 1a is formed at the projecting portion of the X-axis base 1, and an X-axis guide rail 2 extending along the X-axis direction is provided at both sides of the projecting portion. A plurality of cooling fins 1b extending in the X-axis direction are provided on the rear side of the X-axis table. Reference numeral 3 indicates an X-axis table. The X-axis slider 4 is provided on the underside of the X-axis table 3. The X-axis slider 4 of the X-axis table 3 is engaged with the X-axis guide rail 2 so that the X-axis table 3 can move in the X-axis direction. Reference number 5 indicates a linear motor which drives the X-axis table 3, and an armature 6 of the linear motor 5 is accommodated in the recess 1a on the upper surface of the X-axis base 1 while a movable element 7 is attached to the rear side of the X-axis table 3. The armature 6 has an armature winding 6b wound around an armature iron plate 6a in which comb teeth-like iron plates are laminated, and an insulation resin 6c is filled on the outer circumference of the armature winding 6b and is accommodated and fixed in the recess 1a of the X-axis base 1. The movable element 7 is constructed by attaching a permanent magnet 7b to a movable element yoke 7a attached to the rear side of the X-axis table 3. The permanent magnet 7b is disposed so that the adjacent magnetic field surfaces are made different from each other, and is disposed at the same pitch at that of the armature winding 6b of the armature 6. Reference numeral 8 indicates a linear encoder attached to the X-axis base 1, and reference numeral 9 indicates a stopper attached to the X-axis base 1, wherein the stopper 9 is brought into contact with the side of the X-axis table 3. Reference numeral 10 indicates a Y-axis base which is constituted to be gate-shaped. The Y-axis base is disposed so that it is three-dimensionally crossed with and orthogonal to the X-axis table attached to the X-axis base. A recess 10a extending in the Y-axis direction is provided at the center of the upper surface of the Y-axis table, and a Y-axis guide rail is provided at both sides of the recess 10a. A plurality of cooling fins 10b extending in the X-axis direction are provided on the rear side of the Y-axis base 10. Reference numeral 12 indicates a Y-axis table. A Y-axis slider 13 attached to the underside of the Y-axis table 12 is engaged with the guide rail 11 so that the Y-axis table 12 can move in the Y-axis direction. Reference numeral 14 is a linear motor which drives the Y-axis table 12. An armature 15 of the linear motor 14 is accommodated in the recess 10a of the Y-axis base 10, and the movable element 16 is attached to the rear side of the Y-axis table 12. The armature 15 has an armature winding 15b wound around an armature iron plate 15a in which comb teeth-like iron plates are laminated, and an insulation resin 15c is filled on the outer circumference of the armature winding 15b, whereby the armature 15 is accommodated and fixed in the recess 10a of the Y-axis base 10. The movable element 16 is constructed by attaching a permanent magnet 16b to a movable element yoke 16a attached to the rear side of the Y-axis table 12. The permanent magnet 16b is disposed so that the adjacent magnetic field surfaces are made different from each other, as is disposed at the same pitch as that of the armature winding 15b of the armature 15. Reference numeral 17 indicates a linear encoder attached to the Y-axis 12 table and Y-axis base 10. Reference numeral 18 indicates a stopper attached to the Y-axis base 10, which is constituted so that it is brought into contact with the side of the Y-axis table 12. Reference number 19 is a top table guide rail laid in the X-axis direction on the Y-axis table 12, and 20 is the top table. A slider 21 secured on the underside of the top table 20 is engaged with the top table guide rail 19, and supports the top table so that it can move in the X-axis direction. Reference numeral 22 indicates a supporting member secured on the upper surface of the X-axis table 3, and a slider 23 secured on the supporting member 22 is engaged with the guide rail 24 attached at the side of the top table 20 so that the top table 20 can move in the Y-axis direction. Reference numeral 25 is a cooling fan attached between the X-axis base 1 and Y-axis base 10, which sends cooling air to the X-axis base and Y-axis base.

Next, a description is given of the actions of the XY table. As the armature winding 6b of the armature 6 of the linear motor 5 attached to the X-axis base 1 is excited, the X-axis table 3 moves in the X-axis direction along the X-axis guide rail 2. As the X-axis table 3 moves in the X-axis direction, the supporting member 22 provided on the upper surface of the X-axis table 3 causes the top table 20 to move in the X-axis direction along the top table guide rail 19 via the slider 23. Next, as the armature winding 15b of the armature 15 of the linear motor 14 attached to the Y-axis base is excited, the Y-axis table 12 moves in the Y-axis direction along the guide rail 11. In compliance with movements of the Y-axis table in the Y-axis direction, the top table 20 moves in the Y-axis direction integrally with the Y-axis table 12. Thus, the top table 20 moves in the X-axis direction by the linear motor 5 which drives in the X-axis direction, and moves in the Y-axis direction by the linear motor 5 which drives in the Y-axis direction. Since the X-axis table 3 is caused to move by the linear motor 5 and the Y-axis table is caused to move by the linear motor 14, it is possible to accurately carry out positioning thereof. Further, the X-axis table 3 and Y-axis table 14 can be moved at high acceleration and deceleration speeds. Heat generated from the armature winding 6b and 15b of the armatures 6 and 15 of the linear motors 5 and 14 is radiated from the cooling fins 1b and 10b secured on the rear side of the X-axis base 1 and the Y-axis base, which are, respectively, provided with the armatures 5 and 14. In addition, as the cooling fan 25 is driven, cooling air is circulated between the cooling fins 1b of the X-axis base 1 and cooling fins 10b of the Y-axis base 10 in the same direction, whereby the cooling fins are cooled down to further cool down the X-axis base 1 and Y-axis base 10.

According to the invention as described above, the following effects can be brought about. That is, although, in the prior art, it was not possible to carry out accurate positioning since the X-axis table and Y-axis table are moved by a screw connection consisting of a ball screw and a ball nut, with the invention, accurate positioning can be secured because the tables are driven by linear motors. Furthermore, since, as described above, the X-axis table and Y-axis table are driven by linear motors, it is also possible to move the top table at high acceleration and deceleration speeds. Still furthermore, since cooling fins are provided at the rear side of the X-axis base in which the armature of a linear motor is accommodated and the Y-axis base in which the armature of another linear motor is accommodated, it is possible to effectively radiate heat generated from the armature windings.

What is claimed is:

1. An XY table comprising:

an X-axis table movably supported on a base in the X-axis direction;

a supporting member mounted on said X-axis table;

a Y-axis table movably supported on the base in the Y-axis direction; and a top table which is engaged by said supporting member and movable in the X-axis direction in response to movement of said supporting member with respect to said supporting member along with movements of said X-axis table, said top table being also engaged by said Y-axis table and movable in the Y-axis direction with respect to said supporting member along with movements of said Y-axis table;

wherein said XY table further comprises an armature of a linear motor attached on an X-axis base which movably supports said X-axis table, a movable element which is attached to the rear side of said X-axis table and is opposed to the armature of said linear motor, an armature of a linear motor attached to said Y-axis base which supports the Y-axis table, and a movable element which is attached to the rear side of said Y-axis table and is opposed to the armature of said linear motor.

2. An XY table as set forth in claim 1, wherein cooling fins are provided on the rear sides of the X-axis base and Y-axis base.

3. An XY table as set forth in claim 1 or 2, wherein a cooling fan is provided at the rear sides of the X-axis base and Y-axis base.

* * * * *